United States Patent [19]

Katayama et al.

[11] 4,239,362
[45] Dec. 16, 1980

[54] CAMERA FILM ADVANCING APPARATUS

[75] Inventors: Akira Katayama; Toshiaki Hozumi, both of Tokyo, Japan

[73] Assignee: Nippon Kogaku K.K., Tokyo, Japan

[21] Appl. No.: 37,842

[22] Filed: May 10, 1979

[30] Foreign Application Priority Data

May 13, 1978 [JP] Japan .................................. 53/56144

[51] Int. Cl.³ .......................... G03B 1/24; B65H 75/28
[52] U.S. Cl. ....................................... 354/212; 226/83; 242/74
[58] Field of Search ................................ 354/212–216, 354/275; 226/82, 83; 242/71.1, 205; 352/157–158; 242/74, 74.1, 74.2, 193

[56] References Cited

U.S. PATENT DOCUMENTS

| 1,298,393 | 3/1919 | Proctor | 226/83 |
| 2,733,062 | 1/1956 | Del Vale et al. | 226/83 |
| 3,075,427 | 1/1963 | Salzmann | 354/212 X |
| 3,384,319 | 5/1969 | Saito et al. | 242/71.1 |
| 3,465,657 | 9/1969 | Welzel et al. | 354/212 |
| 4,034,388 | 7/1977 | Iwashita et al. | 354/212 X |

Primary Examiner—Michael L. Gellner
Assistant Examiner—Thomas H. Tarcza
Attorney, Agent, or Firm—Fitzpatrick, Cella, Harper & Scinto

[57] ABSTRACT

A camera film advancing apparatus is disclosed which is improved in respect of reliability of engagement between the pawl of the film advancing sprocket and the perforation of the film to simplify the operation necessary for film charging.

3 Claims, 7 Drawing Figures

CAMERA FILM ADVANCING APPARATUS

BACKGROUND OF THE INVENTION

1. Field of the Invention

The present invention relates to a camera film advancing apparatus of the type in which a film is transported through the engagement of a sprocket pawl with the film perforations, and is more particularly directed to improvements in reliability of the engagement in such film advancing apparatus and in simplicity of the film charging operation.

2. Description of the Prior Art

As a film advancing apparatus of the type mentioned above there has been known and widely used apparatus comprising biasing means by which a film pressing member is urged against the circumferential outer surface of a sprocket. At the time of film charge, the film pressing member is moved away from the circumference of the sprocket against the bias force so as to provide a space between the circumferential surface of the sprocket and the film pressing member into which a film is inserted. After the insertion of film into the space, the film pressing member is again returned to its original position in which it is pressed against the circumferential surface of the sprocket by the bias means. As a result, the portion of the film inserted into the space is also pressed against the circumferential surface of the sprocket through the film pressing member so that an engagement is established between the pawl of the sprocket and the perforation of film. The engagement established in this manner is so firm that no disengagement may occur even when the film becomes slack in its passage between the film cartridge and the sprocket.

Although the known apparatus described above can assure a good engagement between the sprocket and film, it has a disadvantage in that the operation involved therein is somewhat troublesome and complicated. Thus, the apparatus in question necessitates two different operations, that is, an operation for forcibly moving the film pressing member away from the circumferential surface of the sprocket and an operation for inserting the film into the formed space. The user must conduct these two separate operations every time the film is charged.

SUMMARY OF THE INVENTION

Accordingly, we have conceived and contribute by the present invention means whereby we are able to eliminate the above described disadvantage involved in the prior art film advancing apparatus.

More specifically, we provide an improved camera film advancing apparatus which is easy to handle and is proof against unintentional disengagement of the sprocket pawl from the film perforations which may be caused by slack in the film or by other difficulties.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DETAILED DESCRIPTION OF THE PREFERRED EMBODIMENTS

Figure 1:
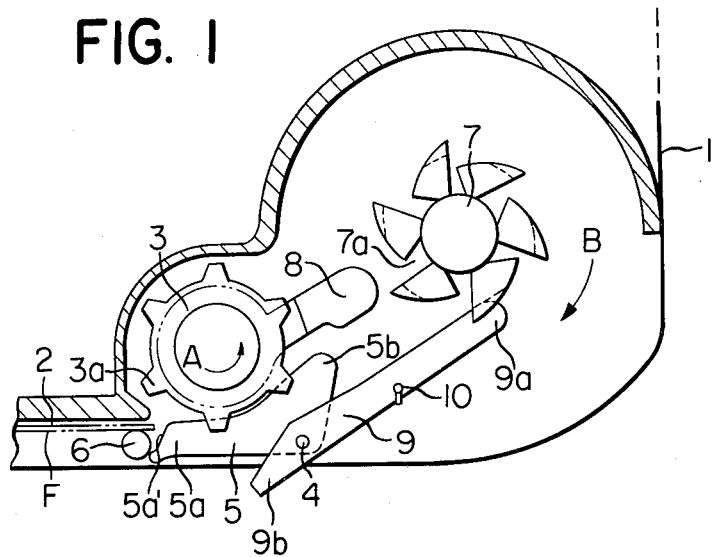
FIG. 1 is a schematic top view of a film advancing apparatus showing an embodiment of the invention.

Referring first to FIG. 1, a camera body is generally designated by 1 and a film by F. The film F is guided along a guide rail 2 and is to be advanced by a sprocket 3. A film wind-up operation makes the sprocket 3 rotate counter-clockwise as indicated by the arrow A in the drawing. At its end portions, the sprocket 3 has pawls 3a regularly distributed along its circumference. At the end of every film wind-up step, the sprocket 3 is restrained from further rotation, but immediately after the completion of winding-up the film, this restraint is removed. Therefore, at the time of film setting, the sprocket 3 is allowed to be rotated manually without any limitation.

Extending in parallel with the sprocket 3 is a pivot pin 4 one end of which is secured to the camera body 1 in the vicinity of the sprocket 3. An anchor member 5 is pivotally mounted on the pivot 4. The surface of the anchor member 5 opposed to the sprocket 3 is contoured to follow the circumference of the end portion of the sprocket. The anchor member is positioned in such manner that at least one sprocket pawl 3a and the anchor member always overlap each other in the axial direction of the sprocket and that between the outer surface of the sprocket and the anchor member's surface opposed thereto there is provided a narrow gap serving as a film passage. In the vicinity of the film entrance end portion 5a of the anchor member 5 there is provided a stopper pin 6 which limits the rotation of anchor member 5 in the clockwise direction as viewed in the drawing. The end surface 5a' of the portion 5a of the anchor member is inclined with respect to the direction of the guide rail 2 so that when the film leading portion is advanced to be set and abuts the end surface 5a' the anchor member 5 is rotated counterclockwise about the pivot pin 4.

The film F coming through the above mentioned film passage is taken up on a spool 7 which is rotated clockwise, as indicated by arrow B in FIG. 1, through a film wind-up motion. As clearly seen in FIGS. 2 to 4, the film take-up spool 7 has a plurality of axial slots 7a (in the shown embodiment, the spool has six slots 7a) which are used to catch the leading end of film F. In the shown embodiment, as seen best in FIG. 1, each axial slot 7a is particularly shaped so as to open toward the direction of rotation for film wind-up, that is, the clockwise direction as viewed in FIG. 1. This particular shape enables the slot 7a to catch the film leader more easily and surely as compared with the conventional device.

Figure 2:
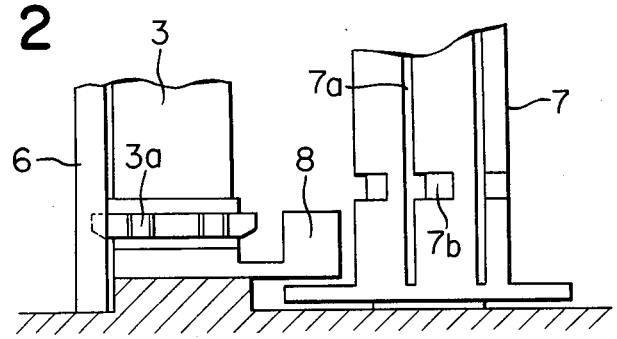
FIG. 2 is a side elevation thereof with the pivot pin, anchor member and safety lever being removed.

As clearly shown in FIGS. 1 and 2, a film guide member 8 extends from the sprocket 3 toward the spool 7. The film guide member 8 is rotatably mounted on the shaft of the sprocket and it is biased toward a clockwise rotation by a spring, not shown. At an opposed position to the guide member 8 there is provided a safety lever 9. The lever 9 is pivotally mounted on the above mentioned pivot pin 4 and is normally under the bias force of a spring 10 which urges one end 9a of the lever toward a position in contact with the outer circumferential surface of the film take-up spool 7. A stopper (not shown) limits the rotation of film guide member 8 and prevents it from going further beyond the position shown in FIG. 1. When the back lid (not shown) of the camera is open, the one end 9a of safety lever 9 is in contact with one of the recesses 7b provided on the circumferential surface of the spool 7 (see FIGS. 1, 3 and 4). When the back lid is closed, it pushes the other end 9b of safety lever 9 and rotates the safety lever clockwise about the pivot 4 so that the end 9a thereof is retracted from the recess 7b.

Figure 3:
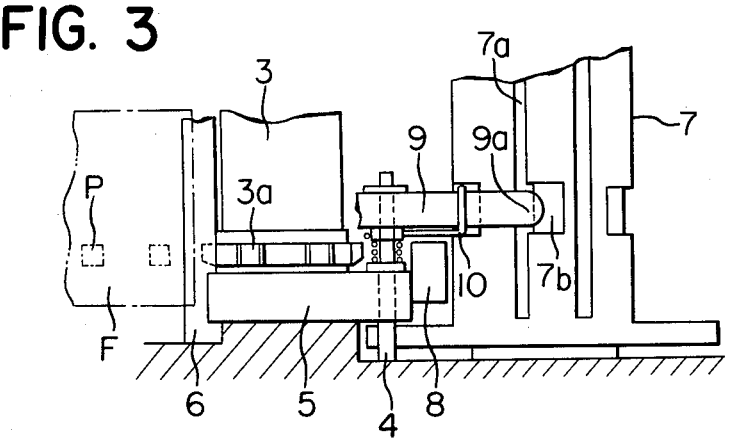
FIG. 3 is a front elevation thereof.
Figure 4:
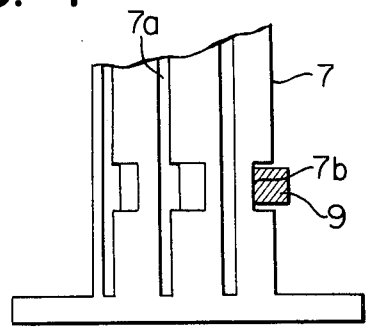
FIG. 4 schematically shows the operational relation between the film spool and safety lever.

With the above described arrangement, the apparatus operates in the following manner:

Initially, the user of the camera places the leading portion of film F on the guide rail 2 as shown in FIGS. 1 and 3 and moves it to the right, as viewed, toward the entrance end 5a of anchor member 5. When the leading edge of film F comes into contact with the slope 5a' formed on the entrance end 5a and pushes it down, the anchor member rotates counter-clockwise about the pivot pin 4. As a result, the anchor end part 5a is moved away from the pawl 3a of sprocket and there is provided a space therebetween. This position corresponds to that shown in FIG. 5, and in this position, no sprocket pawl 3a laps over the anchor end part 5a in the axial direction of the sprocket 3.

By moving the film F further to the right, the film can easily enter the space mentioned above. After a further rightward movement of the film F, the leading edge thereof reaches the other end part 5b of the anchor member 5 and pushes the sloped surface of the end part 5b which is opposed to the sprocket 3. As a result, the anchor member 5 is rotated clockwise about the pivot pin 4 so that the end part 5a of anchor member 5 now pushes the film F against the sprocket 3. Since the film F is advanced to the right while being pushed against the sprocket by the anchor end part 5a in this manner, a film perforation F will come into engagement with any one of the sprocket pawls 3a at the moment when the former falls in with the latter. Upon the time of the engagement being established, the anchor member 5 is allowed to further rotate clockwise about the pivot pin 4 up to the position in which the anchor end part 5a and the sprocket pawl 3a overlap each other looking in the axial direction of the sprocket. Thus, the gap previously formed between the pawl 3a and the anchor end part 5a is completely filled. This position corresponds to that shown in FIG. 6, wherein in the shown embodiment, the sprocket pawl 3a is over the anchor member 5 in the axial direction. However, this positional relation is by no means limitative. The anchor member 5 may be positioned to be over the sprocket pawls in the axial direction.

Figures 5, 6:
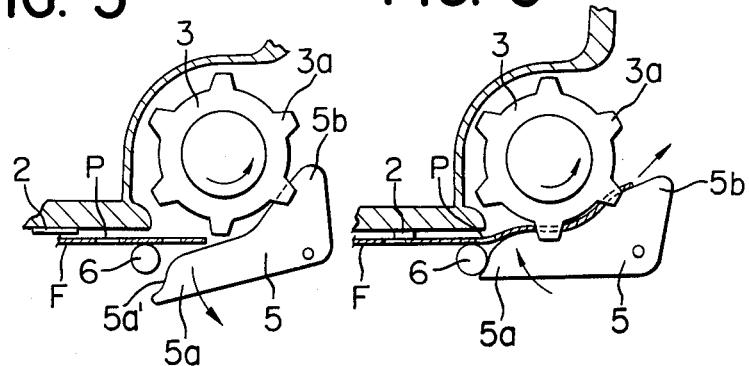
FIGS. 5 and 6 schematically show the manner of film insertion in two different phases of operation.

When the film F is further advanced with its perforations P engaged with the sprocket pawls 3a, the sprocket 3 is rotated with the movement of the film F passing through the film passage now formed between the sprocket 3 and the anchor member 5, as shown in FIG. 6. Since, as previously noted, the anchor member 5 is so positioned that at least one of pawls 3a is always lapping over the anchor member in the axial direction of the sprocket, one or more engagements are established between the pawls and the film perforations after the film F has advanced a substantial distance passing through the film passage as shown in FIG. 6. Therefore, even if there occurs any rotation of the anchor member 5 in the position shown in FIG. 6, any one of the engagements between pawls and perforations can be maintained by the anchor member. Thus, engagement once made between the sprocket and film can never be released during film advance even when the film F becomes slack at the segment lying on the guide rail 2.

Figure 7:
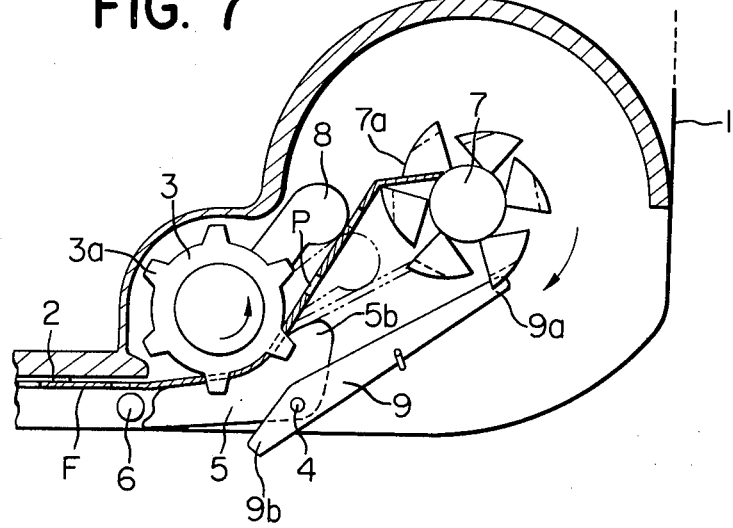
FIG. 7 is a view similar to FIG. 1 but showing the apparatus in the position for film winding-up.

By winding up the film F from the FIG. 6 position, the leading portion of film F is further moved toward the circumference of the spool 7 by the sprocket 3 along the film guide member 8 as suggested by the dotted-chain line in FIG. 7. Since the stopper pin 6 limits the clockwise rotation of the anchor member 5 during this movement of film, there never can occur the condition wherein the anchor member is rotated clockwise by the pressure of the film leading edge against the anchor end 5b so that the other anchor end 5a pushes the film against the circumferential surface of the sprocket. The safety lever 9 also prevents the film leading edge from overshooting beyond the outer circumferential surface of the spool 7 in the rightward direction, as viewed in FIG. 7.

By further winding up the film F, the leading edge thereof is slipped in and engaged in one of the axial slots 7a of the rotating spool 7. As the spool 7 rotates with the film leading edge grasped by one of its slots 7a, the film F is brought into the position indicated in solid lines from the position shown in phantom lines in FIG. 7. The film guide member 8 is also rotated by the film F to the position indicated in solid lines. Now, the film is wound up around the film take-up spool 7 with the rotation of the latter.

All the steps of film advancing operation described above are carried out while keeping the back lid of camera open for the purpose of making sure of good performance of the film wind-up operation. After this ascertainment, the back lid is closed. With the closure of the back lid, the safety lever is turned about the pivot pin 4 so that the lever end 9a is retracted from the spool 7. The lever end 9a no longer contacts the film wound up on the spool and therefore there is no possibility of the film being damaged by the end of safety lever 9.

The above described stopper pin 6 and safety lever 9 are not always necessary for the film advancing apparatus. As mentioned above, the function of the stopper pin 6 is to limit the clockwise rotation of the anchor member 5. This prevents the anchor end portion 5a from pushing the film F against the sprocket 3, otherwise the anchor member 5 may increase the load on the film during the wind-up motion. If such an increase of load is tolerable, then the stopper pin may be omitted from the apparatus. The apparatus can also operate in the same manner as described above.

The function of the safety lever 9 is, as described above, to prevent the leading edge of the film from overshooting rightward, as viewed in FIG. 7. However, such overshoot of film leading edge very seldom occurs. Therefore, the safety lever 9 is also dispensable.

Since the function of the film guide member 8 is to limit the angle at which the film F is directed to the film take-up spool 7, the member 8 may be stationarily fixed at the position shown in FIG. 1. But, by mounting it rotatably on the shaft of sprocket 3, as in the case of the shown embodiment, it is possible to obtain use of the member 8 for other purposes. For example, the member 8 may be used to detect with certainty that the film is wound up by the spool 3. In this case, the counter-clockwise rotation of the member 8 from the position shown in phantom to that indicated in solid lines in FIG. 7 gives an indication that the film is properly charged. In addition, the member 8 can be used to indicate the number of exposed film frames in the camera. Since the member 8 is stepwise rotated counter-clockwise with the increase in diameter of the roll of film wound up around the spool 7, this movement of the member 8 is indicative of the number of film picture frames already exposed and taken up.

For cameras in which a motor drive system is used for film rewinding, the member 8 may have still a further function. Since the member 8 is returned to the position shown in FIG. 1 when film rewinding comes to an end, the return signal can be used to open the driving circuit for the motor drive system. In this manner, by mounting the film guide member 8 rotatably, various possibilities of additional use of the member are available.

As will be understood from the foregoing, according to the present invention, a sure engagement between sprocket pawls and film perforations can be established in a very easy and simple manner only by inserting the leading portion of a film between an anchor member and a sprocket. Once established, the engagement is well maintained and no disengagement occurs even when the film becomes slack at any portion.

We believe that the construction and operation of our novel film advancing apparatus will now be understood and that the advantages thereof will be fully appreciated by those persons skilled in the art.

We claim:

1. In a film advancing apparatus for a camera, comprising a film take-up spool for taking up the film thereon, the spool being formed at its periphery with a plurality of longitudinal slots; a sprocket for advancing the film to the take-up spool; first and second film guide members disposed between the sprocket and the take-up spool and opposed to each other, wherein a leading portion of the film advanced by the sprocket is led to the take-up spool through a space formed between the first and second film guide members so that the leading portion is caught in one of the slots to be taken up by the take-up spool, the improvement comprising:
   means defining recess on the periphery of said take-up spool between adjacent slots;
   the first film guide member being disposed to guide the leading portion of the film advanced by the sprocket to the space formed between the first and second guide members; and
   an end of the second film guide member being disposed for movement into one of the recesses of the take-up spool.

2. Film advancing apparatus according to claim 1, wherein said second film guide member is arranged to cooperate with a camera back lid, whereby when the lid is opened an end of the second film guide member moves into said one of the recesses of the film take-up spool and when the lid is closed the end of the second film guide member is retracted from the recess.

3. Film advancing apparatus according to claim 1, wherein said end of the second film guide member successively enters recesses of the film take-up spool opposed thereto during rotation of the film take-up spool.

* * * * *